United States Patent
Seaford

(10) Patent No.: US 7,263,949 B1
(45) Date of Patent: Sep. 4, 2007

(54) ANIMAL FOOD AND WATER CONTAINER ASSEMBLY

(76) Inventor: Kevin Seaford, 5595 Pebblebrook La., Boynton Beach, FL (US) 33437

( * ) Notice: Subject to any disclaimer, the term of this patent is extended or adjusted under 35 U.S.C. 154(b) by 0 days.

(21) Appl. No.: 11/340,749

(22) Filed: Jan. 27, 2006

(51) Int. Cl.
  *A01K 5/00* (2006.01)
(52) U.S. Cl. ........................................ 119/51.5
(58) Field of Classification Search ............ 119/51.01, 119/51.5, 61.1, 61.5, 61.56; 206/223, 541, 206/547, 549; 220/23.8, 4.24, 524, 23.83
See application file for complete search history.

(56) References Cited

U.S. PATENT DOCUMENTS

| 4,225,052 | A | * | 9/1980 | Tector et al. ............... 220/506 |
| D299,771 | S | | 2/1989 | Kennedy |
| 4,934,549 | A | * | 6/1990 | Allen ......................... 220/4.24 |
| 5,458,087 | A | | 10/1995 | Prior et al. |
| 5,462,192 | A | * | 10/1995 | Pomroy et al. ............. 220/526 |
| 5,615,765 | A | * | 4/1997 | Roericht ................... 206/45.23 |
| 5,671,846 | A | * | 9/1997 | Frank ......................... 206/541 |
| 5,752,464 | A | | 5/1998 | King et al. |
| 5,787,839 | A | | 8/1998 | Magnant et al. |
| 5,823,136 | A | | 10/1998 | Zarski |
| 5,884,580 | A | | 3/1999 | Faircloth, Jr. |
| 6,443,096 | B1 | * | 9/2002 | Prydie ..................... 119/61.56 |

\* cited by examiner

*Primary Examiner*—T. Nguyen

(57) ABSTRACT

An animal food and water container assembly includes a first housing and a second housing each including a bottom wall and a peripheral wall. Each of the peripheral walls has an upper edge defining an opening into the first and second housings. A hinge is attached to an outer surface of each of the peripheral walls and hingedly couples together the first and second housings. The top edges of the first and second housings are positionable in a first position abutting each other or in a second position spaced from each other. A locking member is attached to the first and second housings and is configured to selectively secure the first and second housing in the first position. A first cover is removably positionable over the opening in the first housing and a second cover is removably positionable over the opening in the second housing.

6 Claims, 5 Drawing Sheets

ANIMAL FOOD AND WATER CONTAINER ASSEMBLY

BACKGROUND OF THE INVENTION

1. Field of the Invention

The present invention relates to animal food and water holding devices and more particularly pertains to a new animal food and water holding device for simultaneously holding and transporting both animal food, such as dog food, and water for an animal.

2. Description of the Prior Art

The use of animal food and water holding devices is known in the prior art. U.S. Pat. No. 5,752,464 describes a device having a pair of hinged containers which may be used for holding food and water for a pet animal. Another type of animal food and water holding device is U.S. Pat. No. 5,884,580 including a housing having two compartments therein wherein one of the compartments may be used for holding pet food and the other may be used for holing water. A multiple compartment housing for holding food during traveling is found in U.S. Pat. No. 5,787,839.

While these devices fulfill their respective, particular objectives and requirements, the need remains for a device that compactly as possible holds pet food and water so that the pet food and water may be easily transported. The device should be configured to allow a pet to drink and eat directly from the device to remove the need of additional bowls for serving the water and food to a pet.

SUMMARY OF THE INVENTION

The present invention meets the needs presented above by generally comprising a first housing and a second housing. The first and second housings each include a bottom wall and a peripheral is attached to and extends upwardly from a corresponding one of the bottom walls. Each of the peripheral walls has an upper edge defining an opening into the first and second housings. A hinge is attached to an outer surface of each of the peripheral walls and hingedly couples together the first and second housings. The top edges of the first and second housings are positionable in a first position abutting each other or in a second position spaced from each other. A locking member is attached to the first and second housings and is configured to selectively secure the first and second housing in the first position. A first cover is removably positionable over the opening in the first housing and a second cover is removably positionable over the opening in the second housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
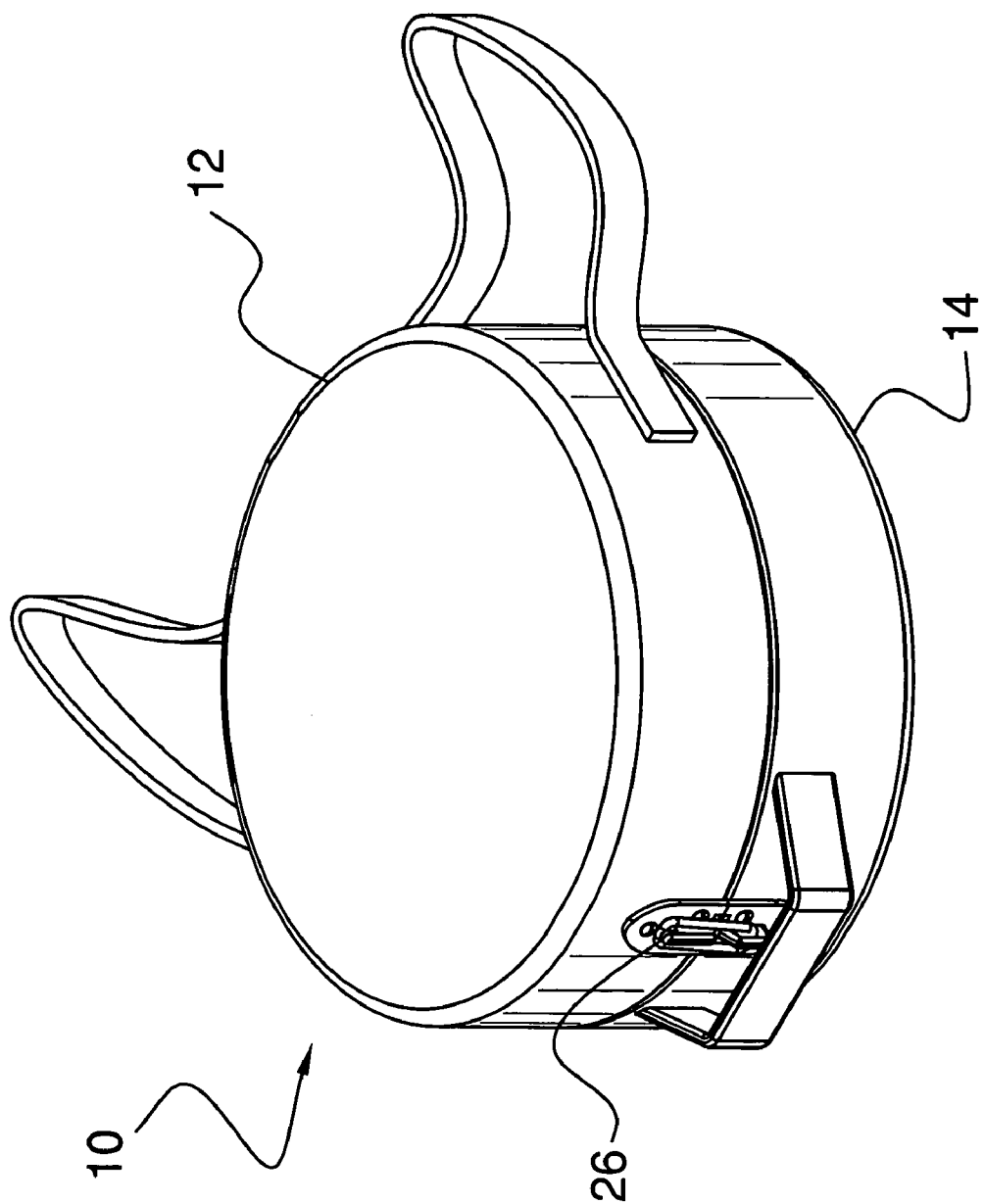
FIG. 1 is a perspective view of an animal food and water container assembly according to the present invention in a first position.
Figure 2:
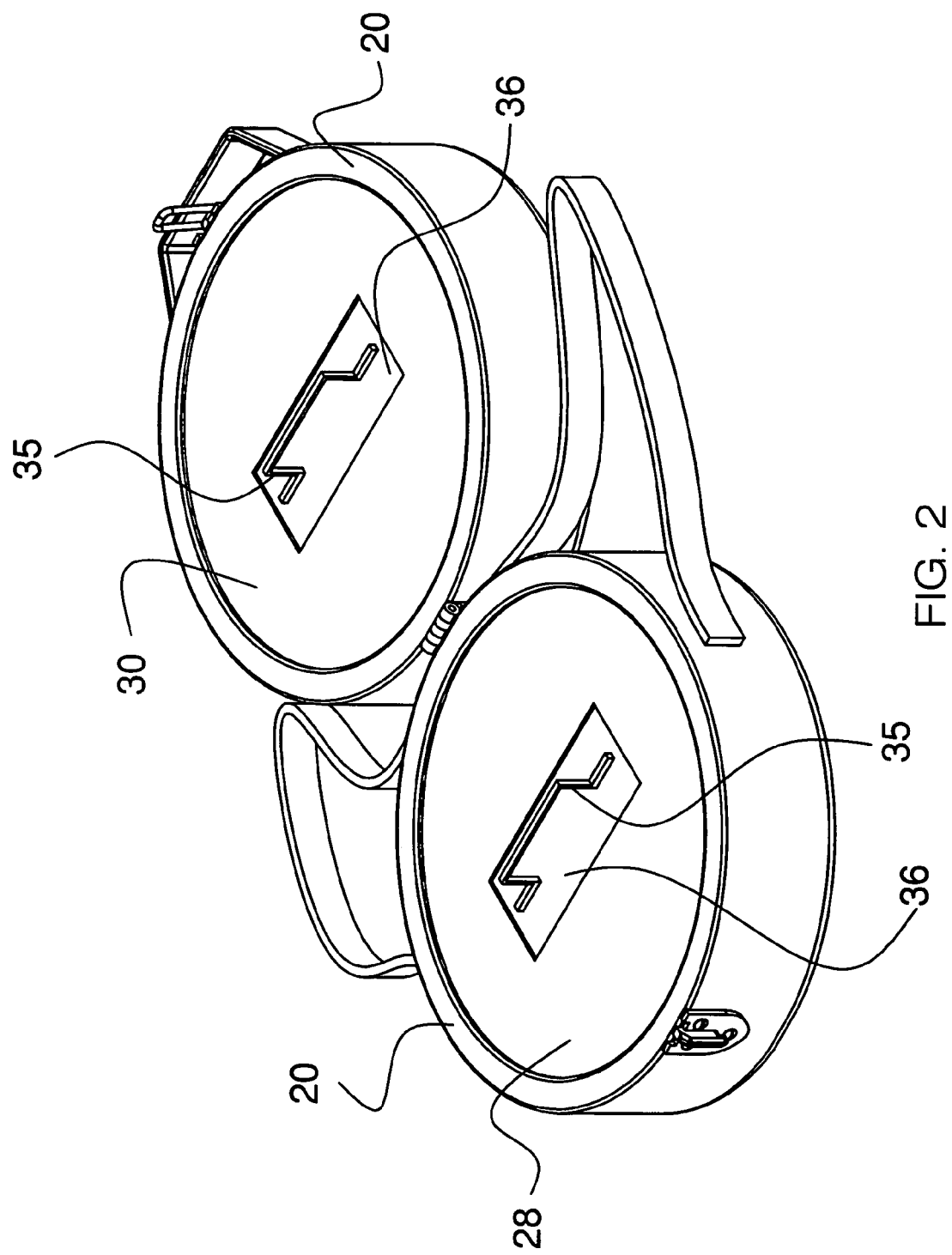
FIG. 2 is a perspective view of the present invention in a second position.
Figure 3:
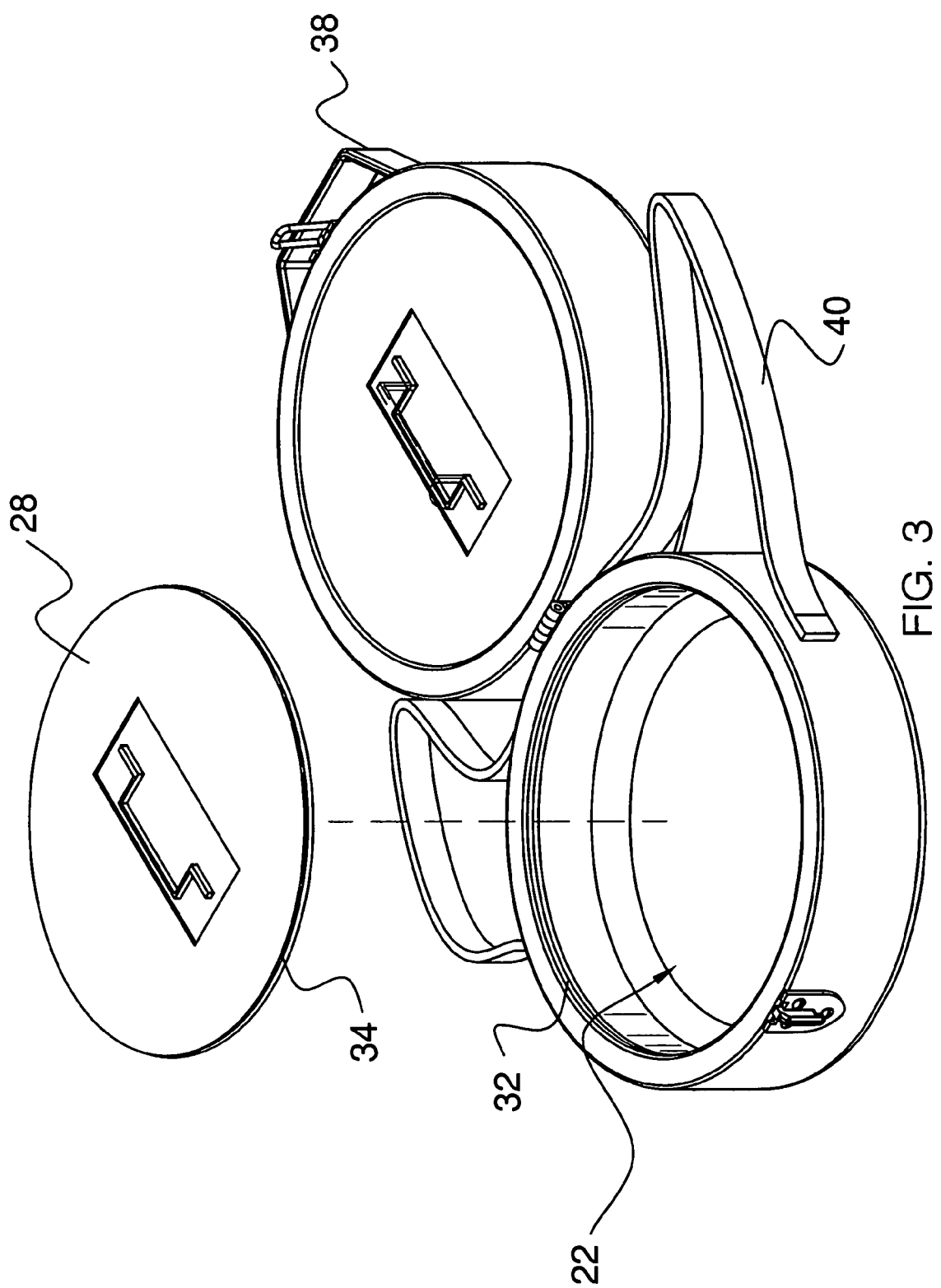
FIG. 3 is a perspective view of the present invention.
Figure 4:
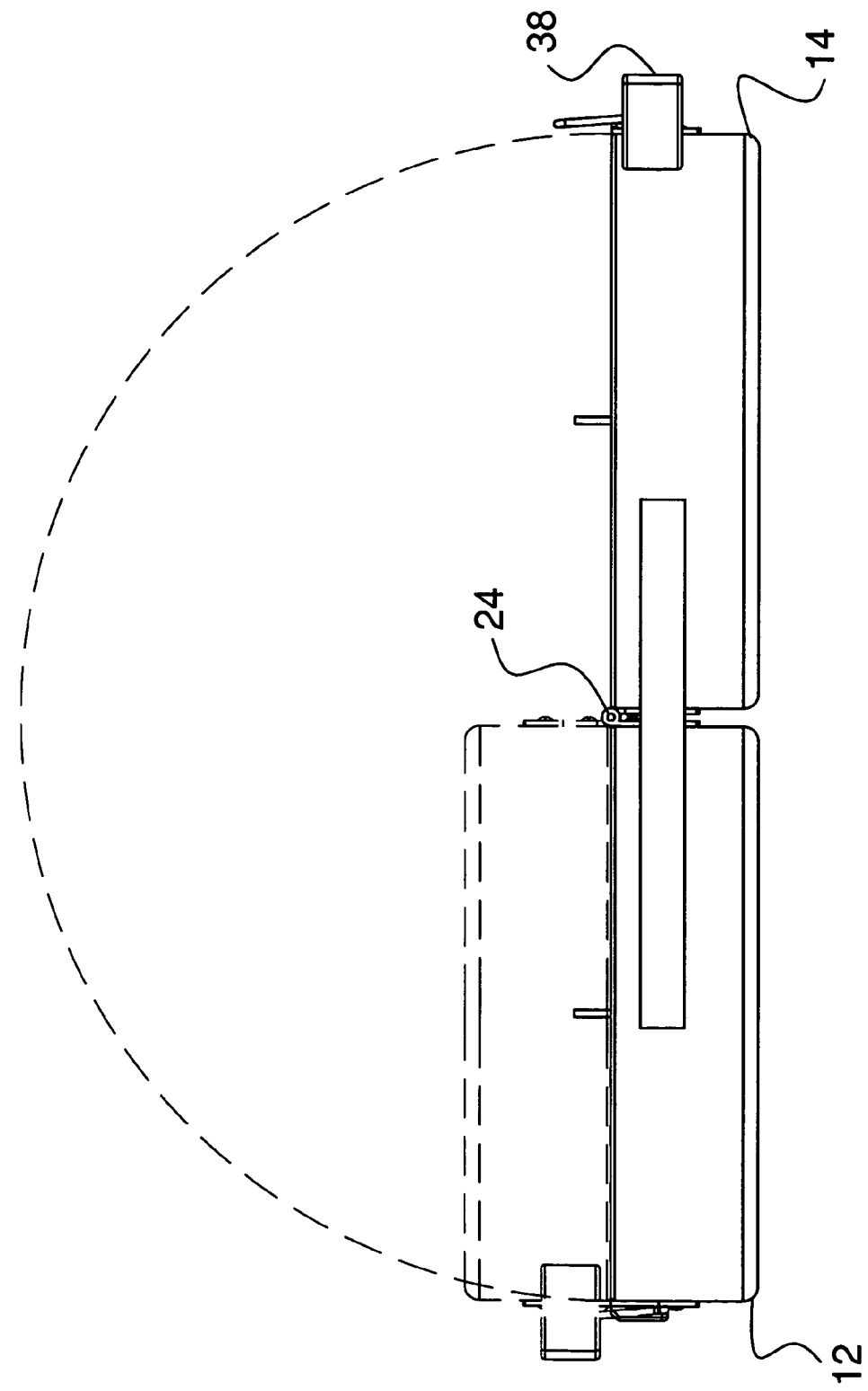
FIG. 4 is a side view of the present invention.
Figure 5:
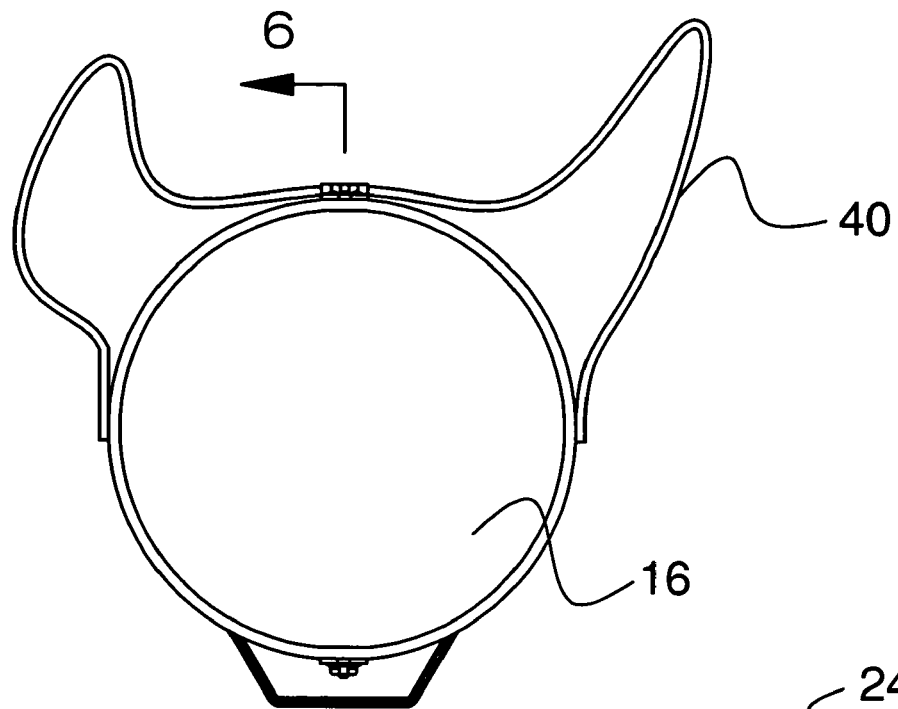
FIG. 5 is a top view of the present invention.
Figure 6:
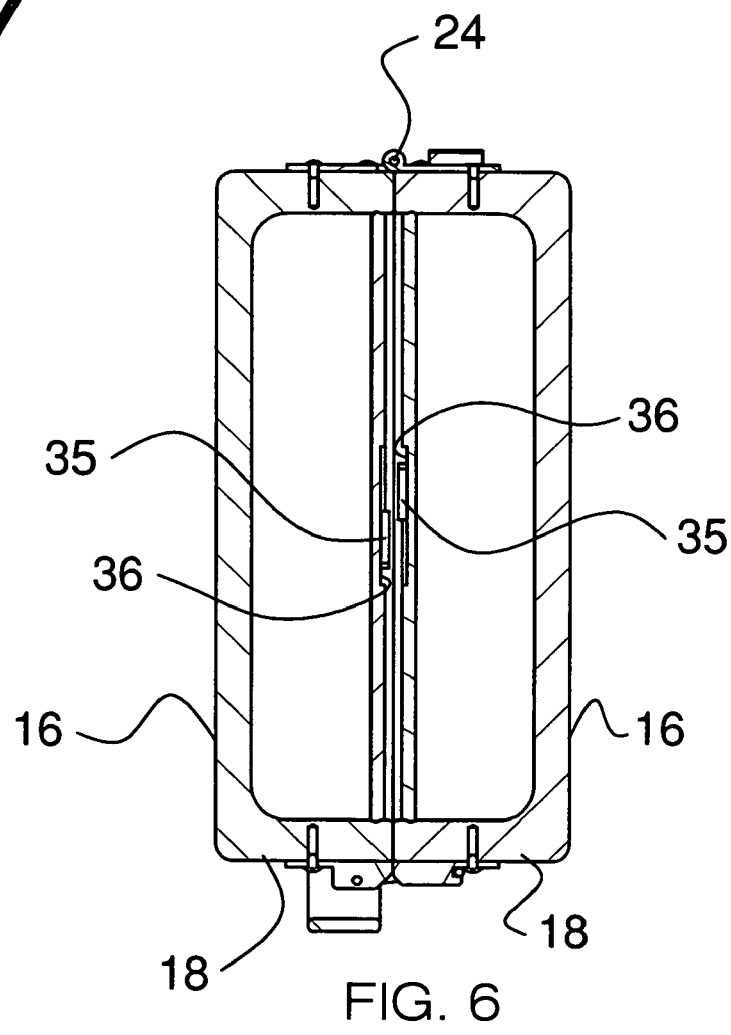
FIG. 6 is a cross-sectional view taken along line 6-6 of FIG. 5 of the present invention.

With reference now to the drawings, and in particular to FIGS. 1 through 6 thereof, a new animal food and water holding device embodying the principles and concepts of the present invention and generally designated by the reference numeral 10 will be described.

As best illustrated in FIGS. 1 through 6, the animal food and water container assembly 10 generally comprises a first housing 12 and a second housing 14. The first 12 and second 14 housings each include a bottom 16 wall and a peripheral 18 that is attached to and extends upwardly from a corresponding one of the bottom walls 16. Each of the peripheral walls 18 has an upper edge 20 defining an opening 22 into the first 12 and second 14 housings. Each of the bottom walls 16 has a circular shape.

A hinge 24 is attached to an outer surface of each of the peripheral walls 18 and hingedly couples the first 12 and second 14 housings together. The top edges 20 of the first 12 and second 14 housings are positionable in a first position abutting each other or in a second position spaced from each other. A conventional locking member 26 is attached to the first 12 and second 14 housings and is configured to selectively secure the first 12 and second 14 housing in the first, or closed position.

A first cover 28 is removably positionable over the opening 22 in the first housing 12. A second cover 30 is removably positionable over the opening 22 in the second housing 14. The peripheral walls 18 each have a threaded inner surface 32 adjacent to a corresponding one of the top edges 20. Each of the first 28 and second 30 covers has a threaded perimeter edge 34. The first 28 and second 30 covers are each threadably couplable to one of the peripheral walls 18.

A pair of grips 35 is provided. Each of the grips 35 is hingedly coupled to one of the first 28 and second 30 covers. Each of the first 28 and second 30 covers has a centrally located depression therein 36. The grips 35 are each positioned in one of the depressions 36 so that they may fold down and be positioned to not interfere in the abutting of the first 12 and second 14 housings against each other in the first position.

A handle 38 is attached to an outer surface of the peripheral wall 18 of the second housing 14. Also, at least one strap 40 is attached to an outer surface of the peripheral wall 18 of the first housing 12.

In use, animal food, such as dog food, is placed in the first housing 12 and secured therein with the first cover 28. Water is the poured into the second housing 14 and secured therein with the second cover 30. The first 12 and second 14 housings are then positioned in the first position to provide a convenient carrying assembly until needed by a caretaker of an animal.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable animal food and water container apparatus comprising:
    a first housing and a second housing, said first and second housings each including a bottom wall and a peripheral being attached to and extending upwardly from a corresponding one of said bottom walls, each of said peripheral walls having an upper edge defining an opening into said first and second housings;
    a hinge being attached to an outer surface of each of said peripheral walls and hingedly coupling said first and second housings, said top edges of said first and second housings being positionable in a first position abutting each other or in a second position spaced from each other;
    a locking member being attached to said first and second housings and being configured to selectively secure said first and second housing in said first position; and
    a first cover being removably positionable over said opening in said first housing, a second cover being removably positionable over said opening in said second housing, said peripheral walls each have a threaded inner surface adjacent to a corresponding one of said top edges, each of said first and second covers having a threaded perimeter edge extending between an upper surface and a lower surface of each of said first and second covers, each of said first and second covers being threadably couplable to one of said peripheral walls
    a pair of grips, each of said grips being hingedly coupled to one of said first and second covers.

2. The apparatus according to claim 1, wherein each of said bottom walls has a circular shape.

3. The apparatus according to claim 1, wherein each of said first and second covers having a centrally located depression therein, each of said grips being positioned in one of said depressions.

4. The apparatus according to claim 1, further including a handle being attached to an outer surface of said peripheral wall of said second housing.

5. The apparatus according to claim 1, further including at least one strap being attached to an outer surface of said peripheral wall of said first housing.

6. A portable animal food and water container apparatus comprising:
    a first housing and a second housing, said first and second housings each including a bottom wall and a peripheral being attached to and extending upwardly from a corresponding one of said bottom walls, each of said peripheral walls having an upper edge defining an opening into said first and second housings, each of said bottom walls having a circular shape;
    a hinge being attached to an outer surface of each of said peripheral walls and hingedly coupling said first and second housings, said top edges of said first and second housings being positionable in a first position abutting each other or in a second position spaced from each other;
    a locking member being attached to said first and second housings and being configured to selectively secure said first and second housing in said first position;
    a first cover being removably positionable over said opening in said first housing, a second cover being removably positionable over said opening in said second housing, said peripheral walls each having a threaded inner surface adjacent to a corresponding one of said top edges, each of said first and second covers having a threaded perimeter edge extending between an upper surface and a lower surface of each of said first and second covers, each of said first and second covers being threadably couplable to one of said peripheral walls to position said covers approximately flush with a corresponding one of said upper edges;
    a pair of grips, each of said grips being hingedly coupled to one of said first and second covers, each of said first and second covers having a centrally located depression therein, each of said grips being positioned in one of said depressions;
    a handle being attached to an outer surface of said peripheral wall of said second housing; and
    at least one strap being attached to an outer surface of said peripheral wall of said first housing.

\* \* \* \* \*